United States Patent
Zhang et al.

(10) Patent No.: US 9,987,780 B2
(45) Date of Patent: Jun. 5, 2018

(54) PLASTIC-METAL COMPOSITE MATERIAL AND MANUFACTURING METHOD THEREOF

(71) Applicant: JANUS (DONGGUAN) PRECISION COMPONENTS CO., LTD., Chang'an Town Dongguan (CN)

(72) Inventors: Shaohua Zhang, Dongguan (CN); Yuhua Lai, Dongguan (CN)

(73) Assignee: GUANGDONG JANUS INTELLIGENT GROUP CORPORATION LIMITED, Dongguan, Guangdong Province (CN)

(*) Notice: Subject to any disclaimer, the term of this patent is extended or adjusted under 35 U.S.C. 154(b) by 455 days.

(21) Appl. No.: 14/418,354

(22) PCT Filed: Jul. 19, 2013

(86) PCT No.: PCT/CN2013/079722
§ 371 (c)(1),
(2) Date: Jan. 29, 2015

(87) PCT Pub. No.: WO2014/198081
PCT Pub. Date: Dec. 18, 2014

(65) Prior Publication Data
US 2015/0183145 A1  Jul. 2, 2015

(30) Foreign Application Priority Data
Jun. 9, 2013 (CN) .......................... 2013 1 0231734

(51) Int. Cl.
| | |
|---|---|
| B22F 3/22 | (2006.01) |
| B29C 45/14 | (2006.01) |
| B29C 59/00 | (2006.01) |
| B29K 705/00 | (2006.01) |

(52) U.S. Cl.
CPC .............. B29C 45/14 (2013.01); B22F 3/225 (2013.01); B29C 59/002 (2013.01); *B22F 2998/10* (2013.01); *B29C 45/14778* (2013.01); *B29C 2045/14327* (2013.01); *B29C 2045/14868* (2013.01); *B29K 2705/00* (2013.01); *Y10T 428/24347* (2015.01)

(58) Field of Classification Search
None
See application file for complete search history.

(56) References Cited

U.S. PATENT DOCUMENTS

| | | | | |
|---|---|---|---|---|
| 3,579,365 | A * | 5/1971 | Grunwald et al. | .... C23C 18/208 106/1.24 |
| 2011/0318585 | A1* | 12/2011 | Su | ................. B29C 45/14311 428/419 |
| 2013/0075941 | A1* | 3/2013 | Chang | ............... B29C 45/14311 264/1.7 |

FOREIGN PATENT DOCUMENTS

| | | |
|---|---|---|
| CN | 1467075 | 1/2004 |
| CN | 101722622 | 6/2010 |
| CN | 101941271 | 1/2011 |
| CN | 103129027 | 6/2013 |
| JP | 2009-113266 | 5/2009 |
| JP | 2011-189631 | 9/2011 |
| WO | 2012-070654 | 5/2012 |

OTHER PUBLICATIONS

Office Action dated Oct. 5, 2015 for Korean Patent Application Serial No. 10-2014-7025391, 6 pages.

* cited by examiner

Primary Examiner — Jessee R Roe
Assistant Examiner — Ngoclan T Mai
(74) Attorney, Agent, or Firm — Hamre, Schumann, Mueller & Larson, P.C.

(57) ABSTRACT

Disclosed are a plastic-metal composite material and a manufacturing method thereof. The method including: S1. injection molding: subjecting a mixture of a metal powder and a binder to injection molding to form a metal structural member of a preset shape; S2. degreasing and sintering: subjecting the metal structural member to degreasing and sintering to remove the binder, to form 0.5-2 μm micron-sized micropores on a surface of the metal structural member; S3. nanocrystallization: on the basis of the micron-sized micropores, forming 20-40 nm nano-sized micropores by etching with a chemical etching reagent; and S4. injection molding: placing the metal structural member filled with a chemical reagent in an injection mold for injection molding to be integrated with a plastic. The composite material is a product manufactured according to the method. The application solves the problem that the metal structural member is difficult to be molded.

9 Claims, No Drawings

US 9,987,780 B2

PLASTIC-METAL COMPOSITE MATERIAL AND MANUFACTURING METHOD THEREOF

CROSS REFERENCE TO RELATED APPLICATIONS

This application is a national application of PCT/CN2013/079722, filed on Jul. 19, 2013. The contents of PCT/CN2013/079722 are all hereby incorporated by reference.

BACKGROUND

Technical Field

The present application relates to a composite material, and particularly, to a plastic-metal composite material and a manufacturing method thereof.

Related Art

On 3C electronic products, in order to improve product strength or obtain more desirable appearance and texture, a metal member and a plastic are often subjected to injection molding in a mold, to achieve the objectives of improving the structural strength, lowering the overall thickness of a product, and obtaining more desirable appearance and texture. However, because of a generally low direct cohesiveness between a metal and a plastic, in a usual method, some interlocking structures are fabricated on the metal, so that the plastic "enclasps" the metal. However, due to a difference in shrinkage between a metal and a plastic, after molding in the mold, the product is easily deformed. Moreover, an interlocking structure needs to be added on the metal, which increases the amount of processing and fabrication cost of the metal member.

In addition, if the metal member is used as an appearance structural member, assembly structures such as various fasteners and notches need to be processed and fabricated on the metal member, while such type of structure generally cannot be molded in the manner of stamping, and can merely be processed by expensive CNC, which greatly increases the fabrication cost of the metal structural member.

Nano molding technology (NMT) is a plastic and metal integration technology originating from Japan, in which a nanopore structure is first formed on a metal surface by etching, then, injection molding is directly performed on the metal surface, thereby forming a stable physical connection between the plastic and the metal. However, by the NMT technology, the etching process needs to be repeated several times for a long time to form an effective nanostructure on the metal surface, which uses a large amount of etching solution. Also, efficiency needs to be further improved.

SUMMARY

A technical problem to be solved by the present application is to provide a plastic-metal composite material and a manufacturing method thereof for preparing a composite part commonly used in electronic products, which can improve production efficiency, reduce production cost, and achieve better connection strength.

The technical problem of the present application is solved by means of the following technical solutions:

A manufacturing method of a plastic-metal composite material is provided, in which the composite material includes a plastic and a metal, and the method includes the following steps:

S1. metal powder injection molding: subjecting a mixture of a metal powder and a binder to injection molding on an injection molding machine to form a metal structural member of a preset shape;

S2. metal structural member degreasing and sintering: subjecting the metal structural member to degreasing and sintering to remove the binder, so as to form 0.5-2 μm micron-sized micropores on a surface of the metal structural member;

S3. nanocrystallization of the micron-sized micropores: on the basis of the micron-sized micropores, forming 20-40 nm nano-sized micropores by etching with a chemical etching reagent; and S4. injection molding: placing the metal structural member filled with a chemical reagent in an injection mold for injection molding to be integrated with the plastic.

Preferably:

A step is further included between Step S3 and S4: Step S300. reagent filling: filling the chemical reagent in the micropores on the surface of the metal structural member, to form a stable connection through a chemical reaction between the chemical reagent and the plastic; and A step is further included between Step S2 and Step S3: Step S200. cleaning: cleaning the metal structural member after degreasing and sintering to remove dirt and grease on the surface of the metal structural member.

The chemical reagent in Step S4 is one of an aqueous solution and an organic solution, whose solute contains a functional group capable of forming a chemical bond through one of an esterification reaction, condensation polymerization, a substitution reaction and an addition reaction with the plastic.

Components of the plastic include at least one of PPS, PBT, and PA, the solute is at least one of a small-molecule compound containing an amino functional group and an ester small-molecule compound, and the molecular weight of the small-molecule compound is less than 1,000, the molecular weight of the ester small-molecule compound is less than 1,000.

Components of the plastic include PC, and the solute is a chemical crosslinking agent.

The plastic is a plastic containing an amide structure, the solute is an alkene monomer compound, and the molecular weight of the alkene monomer compound is less than 1,000.

The metal is one of an aluminum alloy, a magnesium alloy, stainless steel, a zinc alloy and a titanium alloy.

The plastic-metal composite material includes a metal and a plastic; and further includes a connection medium; nano-sized micropores are distributed on a surface where the metal and the plastic are connected; the connection medium is distributed in the nano-sized micropores, and at least a part of the connection medium forms a stable connection structure with the plastic through a chemical reaction with the plastic.

Compared with the prior art, the method of the embodiments uses metal powder injection molding to form a metal structural member, so that a relatively complex structure can be molded, subsequent CNC could be avoided, and productivity could be high; a micron-sized micropore structure can be formed by sintering, chemical etching is performed on the basis of the micropore structure, and the chemical etching solution can enter the micron-sized micropores on the metal surface, so that nano-sized micropores are formed by etching on the basis of the micron-sized micropores. Compared with the conventional NMT technique, the amount of etching solution and the formation time of the nanopores could be significantly reduced, the cost could be saved, the efficiency could be improved, and the problem that the metal structural member is difficult to be molded could be solved, making remarkable progress.

In a preferred solution, before injection molding, a chemical reagent is first filled in the micropores on the surface of the metal structural member, to form a stable chemical connection through a chemical reaction between the chemical reagent and the plastic. Compared with simple physical interlocking of the conventional NMT technique, the chemical bonding is added, and the bonding strength between the plastic and the metal is significantly improved.

DETAILED DESCRIPTION OF EMBODIMENTS

In the following, the present application is further described with reference to preferred implementation manners.

A manufacturing method of a plastic-metal composite material includes the following steps:

1) Product structure design: product size and structure are designed according to requirements, in which a metal structure and a plastic structure are included.

2) Metal powder injection molding: A mixture of a metal powder and a binder is subjected to injection molding on an injection molding machine to form a metal structural member of a preset shape. As for this step, reference can be made to an existing metal powder injection molding technology.

3) Metal structural member degreasing and sintering: Degreasing and sintering is performed on the metal structural member to remove the binder, so as to form 0.5-2 μm micron-sized micropores on a surface of the metal structural member. During degreasing and sintering, after the binder is removed, larger micron-sized micropores are formed at the original positions of the binder. The micron-sized micropores can provide an etching contact channel for the etching solution to contact the metal for chemical etching to form nano-sized micropores, thereby significantly improving formation efficiency of the nano-sized micropores.

4) Cleaning: The metal structural member after degreasing and sintering is cleaned to remove dirt and grease on the surface of the metal structural member.

5) Nanocrystallization of the micron-sized micropores: On the basis of the micron-sized micropores, 20-40 nm nano-sized micropores are formed by etching with a chemical etching reagent. As for the chemical etching reagent in this step, reference can be made to the etching solution in the existing NMT technology, a weak acid of pH>4 or a weak alkali of pH<10 is preferably adopted, so as to accurately obtain a nano-sized micropore structure.

6) Reagent filling: A chemical reagent is filled in the micropores on the surface of the metal structural member, to form a stable connection through a chemical reaction between the chemical reagent and the plastic. The chemical reagent is preferably one of an aqueous solution and an organic solution, whose solute preferably contains a functional group capable of forming a chemical bond through one of an esterification reaction, condensation polymerization, a substitution reaction and an addition reaction with the plastic, so that in the subsequent injection molding process, the plastic enters the nano-sized micropores, and the chemical reagent filled in the nano-sized micropores reacts with the plastic to form a stable chemical bond, thereby forming a stable connection with the plastic. Alternative examples of the chemical reagent for several common plastics are as follows: if components of the plastic includes at least one of PPS, PBT, and PA, the solute is at least one of a small-molecule compound containing an amino functional group and an ester small-molecule compound, and the molecular weight of the small-molecule compound is less than 1,000, the molecular weight of the ester small-molecule compound is less than 1,000, for example, aminoacetamide methyl ester and glyoxal formamide methyl ester; or if components of the plastic include PC, the solute is a chemical crosslinking agent, for example, diisocyanate, ethylene glycol, 1,4-butanediol, 2-propylene oxide, dimethylol butanoic acid, triethylamine, triethylene diamine, and dimethyl ethanolamine; or if the plastic is a plastic containing an amide structure, the solute is an alkene monomer compound, and the molecular weight of the alkene monomer compound is less than 1,000.

7) Injection molding with a mold: The metal structural member filled with the chemical reagent is placed in an injection mold for injection molding to be integrated with the plastic.

8) Metal surface treatment: Subsequent treatment such as surface gloss treatment and color treatment is performed on the composite material surface.

Through the above manufacturing method, a novel plastic-metal composite material is obtained in this embodiment, which includes a metal and a plastic, and further includes a connection medium; the nano-sized micropores are distributed on a surface where the metal and the plastic are connected; the connection medium is distributed in the nano-sized micropores, and at least a part of the connection medium forms a stable connection structure with the plastic through a chemical reaction with the plastic. The connection medium described above is a substance formed through a chemical reaction between the filled chemical reagent and the plastic.

In the above, the present application is further described in detail with reference to the specific preferred implementation manners, and it should not be construed that the specific implementation of the present application is limited to these descriptions. Several equivalent replacements and obvious variations with the same performance or use may be made by persons skilled in the art without departing from the spirit of the present application, and should all be considered as falling within the protection scope of the present application.

What is claimed is:

1. A manufacturing method of a plastic-metal composite material, wherein the composite material comprises a plastic and a metal, the method comprising:
   S1. metal powder injection molding: subjecting a mixture of a metal powder and a binder to injection molding on an injection molding machine to form a metal structural member of a preset shape;
   S2. metal structural member degreasing and sintering: subjecting the metal structural member to degreasing and sintering to remove the binder, so as to form 0.5-2 μm micron-sized micropores on a surface of the metal structural member;
   S3. nanocrystallization of the micron-sized micropores: on the basis of the micron-sized micropores, forming 20-40 nm nano-sized micropores by etching with a chemical etching reagent; and
   S4. injection molding with a mold: placing the metal structural member filled with a chemical reagent in an injection mold for injection molding and the plastic entering the nano-sized micropores.

2. The manufacturing method according to claim 1, between Step S3 and Step S4, further comprising:
   S300. reagent filling: filling the chemical reagent in the micropores on the surface of the metal structural member, to form a stable connection through a chemical reaction between the chemical reagent and the plastic.

3. The manufacturing method according to claim 1, between Step S2 and Step S3, further comprising:
  S200. cleaning: cleaning the metal structural member after degreasing and sintering to remove dirt and grease on the surface of the metal structural member.

4. The manufacturing method according to claim 1, wherein the chemical reagent in Step S4 is one of an aqueous solution an organic solution, whose solute contains a functional group capable of forming a chemical bond through one of an esterification reaction, condensation polymerization, a substitution reaction and an addition reaction with the plastic.

5. The manufacturing method according to claim 4, wherein components of the plastic comprise at least one of polyphenylene sulfide (PPS), polybutylene terapthaltate (PBT), and polyamide (PA), the solute is at least one of a small-molecule compound containing an amino functional group and an ester small-molecule compound, and the molecular weight of the small-molecule compound is less than 1,000, the molecular weight of the ester small-molecule compound is less than 1,000.

6. The manufacturing method according to claim 1, wherein the metal is one of an aluminum alloy, a magnesium alloy, stainless steel, a zinc alloy and a titanium alloy.

7. The manufacturing method according to claim 2, between Step S2 and Step S3, further comprising:
  S200. cleaning: cleaning the metal structural member after degreasing and sintering to remove dirt and grease on the surface of the metal structural member.

8. The manufacturing method according to claim 4, wherein components of the plastic comprise polycarbonate (PC), and the solute is a chemical crosslinking agent.

9. The manufacturing method according to claim 4, wherein
  the plastic is a plastic containing an amide structure, the solute is an alkene monomer compound, and the molecular weight of the alkene monomer compound is less than 1,000.

\* \* \* \* \*